Oscar P. Monson,
Inventor,
Koenig and Pope,
Attorneys.

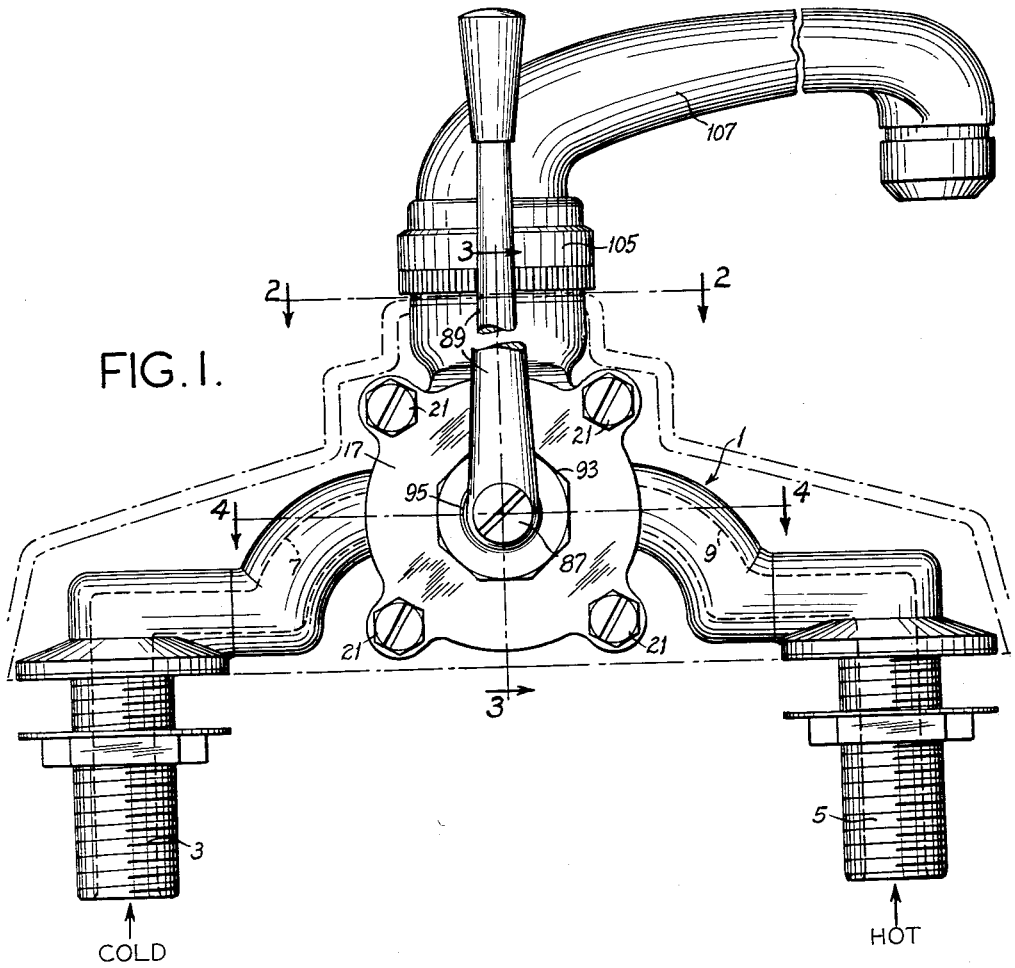
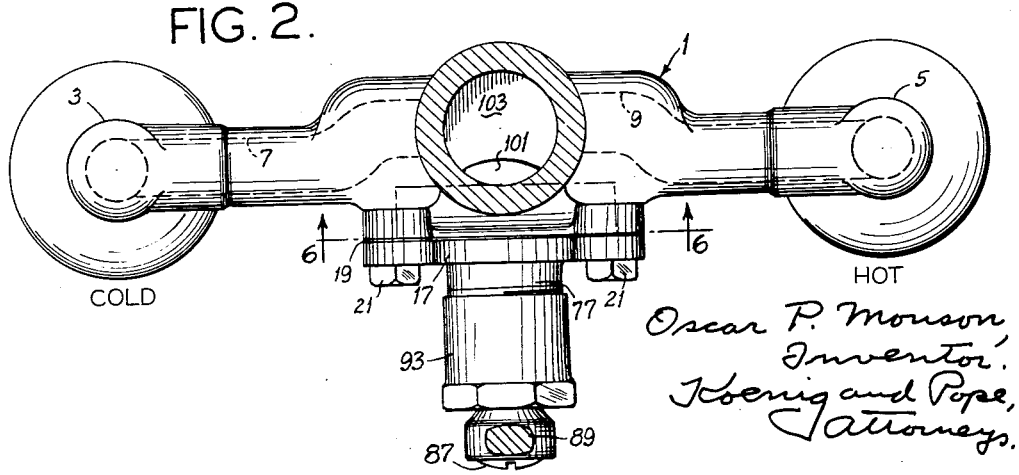

March 6, 1962 O. P. MONSON 3,023,784
FLUID MIXING VALVE
Filed Sept. 22, 1958 3 Sheets-Sheet 3
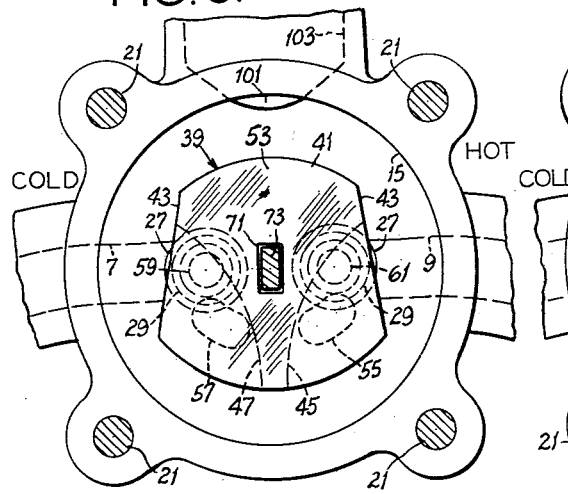
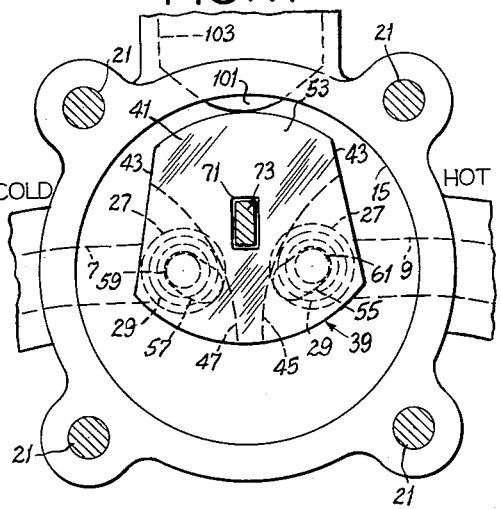
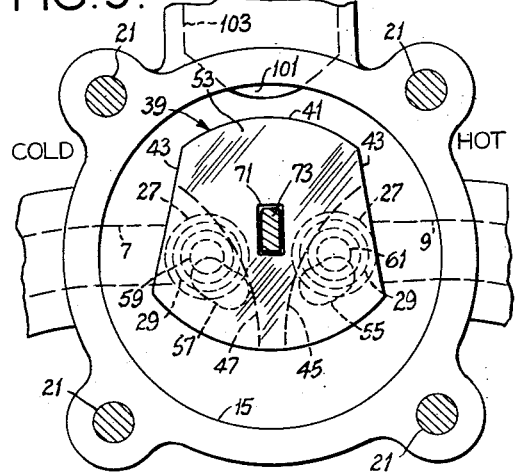
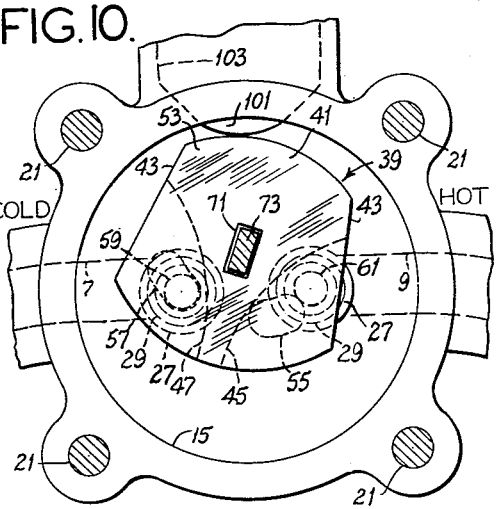
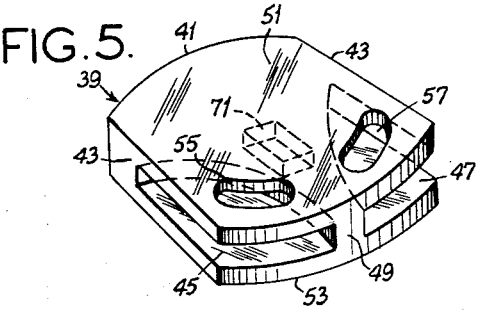
Oscar P. Monson,
Inventor,
Koenig and Pope
Attorneys.

United States Patent Office 3,023,784
Patented Mar. 6, 1962

3,023,784
FLUID MIXING VALVE
Oscar P. Monson, Kenosha, Wis., assignor, by mesne assignments, to Federal-Huber Company, Chicago, Ill., a corporation of Illinois
Filed Sept. 22, 1958, Ser. No. 762,512
5 Claims. (Cl. 137—625.17)

This invention relates to fluid mixing valves, and more particularly (but without limitation) to such valves for water faucet constructions.

Among the several objects of the invention may be noted the provision of an improved low-cost and reliable mixing valve construction adapted in response to certain movements of a handle to determine the proportions of dispensed fluid (hot and cold water in the case of a faucet) and by transverse movements to control the volume of mixed fluids which are dispensed; the provision of a valve of the class described which eliminates former undesirable stem sealing or packing means which were in the nature of perishable diaphragms, boots, bellows and the like which were subject to deterioration and leakage; and the provision of a valve of the class described which initially is, and remains, easy to operate throughout a long and trouble-free life. Other objects and features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the following drawings, in which one of various possible embodiments of the invention is illustrated, FIG. 1 is a rear elevation of a typical mixing faucet embodying my new valve construction, the broken lines illustrating a cover;

FIG. 2 is a horizontal section taken on line 2—2 of FIG. 1, the cover being omitted;

FIG. 5 is a perspective view of said valve part;

FIG. 6 is an enlarged cross section taken on line 6—6 of FIG. 2, showing parts in said off position;

FIG. 7 is a view similar to FIG. 6, showing parts in an intermediate dispensing full-on mixing position;

FIG. 9 is a view similar to FIG. 7, showing parts in a dispensing partly-on mixing position;

FIG. 10 is a view similar to FIG. 7, showing parts in a full-on cold nonmixing dispensing position.

Corresponding reference characters indicate corresponding parts throughout the several views of the drawings.

Figure 4:
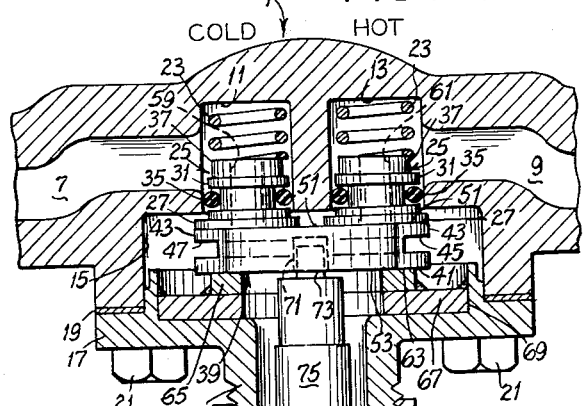
FIG. 4 is an enlarged horizontal section taken on line 4—4 of FIG. 1, showing parts in said off position.

Referring now more particularly to FIGS. 1 and 2, there is shown at numeral 1 a water-conducting manifold having dual cold and hot water inlets 3 and 5 which communicate through passages 7 and 9 with internal sockets 11 and 13, respectively. These sockets constitute extensions from a mixing space or valve chamber 15 enclosed by a cover 17 which is sealed by a gasket 19 and held in place by bolts 21. The sockets 11 and 13 contain individual compression springs 23 respectively located behind individual movable tubular valve seats 25 (FIG. 4).

Each seat 25 is composed of hard noncorroding material. Each has an end flange 27, which is flat-faced and circularly grooved, as shown at 29. The flat facing is produced by flat-lapping to a high degree of accuracy. The grooves 29 aid the flat-lapping process and also eliminates sticking when opening and closing the faucet. Behind each end flange 27 is a cylindrical part 31 which loosely fits into its respective socket 11 or 13. Each cylindrical part 31 is peripherally grooved, as shown at 33, so as to accept an O ring 35 adapted for sealing engagement with the cylindrical wall of the respective socket 11 or 13. The grooves 33 are sufficiently wider than the O rings to permit some rolling contact action between each O ring and the adjacent socket wall as the cylindrical portions 31 move therein. Behind each cylindrical portion 31 is a buttress portion 37 engaged by the respective compression springs 23. Openings or ports which make the seats 25 tubular are shown at 59 and 61. Thus it will be seen that the seats 25 in the sockets 11 and 13 are biased in an outward direction by the springs 23 while at the same time being peripherally sealed therein by the O rings 35.

At numeral 39 is a movable valve member shown individually in FIG. 5 with its port side up. This consists of a plate or disc 41 of hard noncorroding material, having flat sides 43 and being sliced or notched flatwise as shown at 45 and 47. Between the notches remains a stiffening wall portion 49. The opposite faces 51 and 53 of the disc 41 are flat-lapped to a high degree of accuracy. The face 51 is for sliding sealing engagement with the flat-lapped faces of the end flanges 27 of the movable seats 25. The purpose of the other flat-lapped face 53 will appear.

Extending from the respective notches 45 and 47 to the flat-lapped face 51 are circularly disposed acruate ports 55 and 57, respectively, adapted to be moved into and out of register with respective ports 61 and 59 in the respective spring-pressed seats 25. Registry is accomplished by rotary and radial sliding movements of the disc 41, as will appear.

The flat-lapped surface 53 of the disc 41 engages a flat-lapped surface 63 of a fixed seating ring or dam 65, also composed of a hard noncorroding material which is flat-lapped to a high degree of accuracy. This ring 65 is permanently attached, as by welding or soldering, to an annular sealing plate 67 which is fixedly carried in a recess 69 of said cover 17, as by soldering or the like. It will thus be seen that the disc 41 is adapted for sliding movements of rotation and translation in flat-lapped contact between its face 53 and the face 63 of ring 65, and with flat-lapped contact of its face 51 with the flat ends of the seats 25. The compression springs 23 maintain the sliding engagement.

Located in the face 53 of disc 41 within the confines of wall 49 is an elongate socket or blind recess 71. This socket 71 does not communicate with either of the slots 45 or 47 and forms a loose keying engagement with a rectangular key portion 73 on the end of a stepped control stem 75. This stem rocks and rotates in a hollow threaded extension 77 of the cover 17, being provided with a spherical ball 81 which fits rotatably in a seat 79 at the end of extension 77. The end of extension 77 around seat 79 is oppositely notched, as shown at 78. This ball 81 may be composed of metal or, if desired, of a nonsqueaking bearing material such as nylon. Opposite ends of a pin 80 in ball 81 extend into the notches 78 in order to limit ball rotation around the axis of stem 75, regardless of the angular orientation of this axis, the notches having proper arcuate lengths and axial depths for the purpose.

On the other side of the ball is an extension 83 having a threaded socket 85 for accepting a screw 87 employed for attaching a handle 89. Axial splines 91 connect the handle 89 and extension 83. Threaded to the extension 77 is a cap 93, inwardly flanged as shown at 95 to provide an opening 97 loosely accommodating the extension 83. A compression spring 99 reacts between the flange 95 and an annular cap 82 on the ball 81, frictionally to hold the ball in any position into which it may be placed by handle 89.

Figure 3:
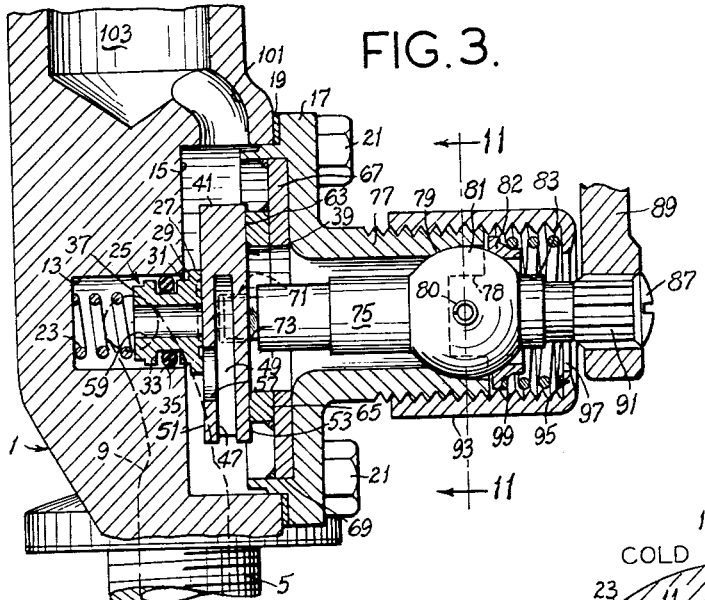
FIG. 3 is an enlarged vertical section taken on line 3—3 of FIG. 1, showing movable parts in an off position.
Figure 11:
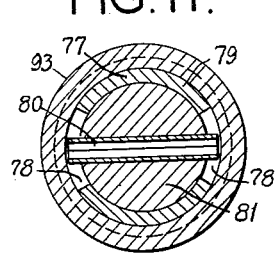
FIG. 11 is a vertical section taken on line 11—11 of FIG. 3.
Figure 8:
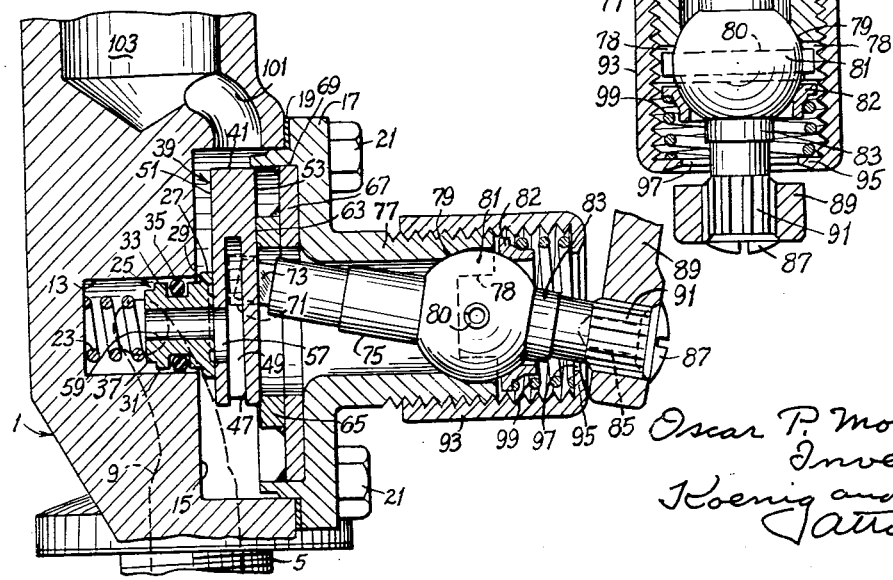
FIG. 8 is a view similar to FIG. 3, but showing parts in the FIG. 7 dispensing full-on mixing position.

As indicated in FIGS. 1, 3 and 8, the space 15 has an outlet 101. This communicates with an outlet chamber 103 in the manifold 1, to which is attached by suitable coupling means 105 a swiveling faucet 107.

Operation is as follows, assuming pressurized cold and hot water supplies attached to the inlets 3 and 5, respectively.

When the handle 89 is in a vertical position as illustrated in FIGS. 1, 3 and 4, the key 73 centrally positions the socket 71 and disc 41 as shown in FIG. 6. This is an off position in which the ports 57 and 55 are out of registry with the openings or ports 59 and 61, respectively.

Next, if the handle 89 is forced away from the manifold 1, i.e., upward relative to the plane of the paper in FIG. 1, then the positions of internal parts will be as shown in FIGS. 7 and 8, wherein the ball 81 has rocked clockwise in its socket (FIG. 8) and the stem 75 has angled up so as to move up the disc 41 (FIG. 7). This fully registers the ports 57 and 55 with the ports 59 and 61, respectively, and allows full flow of cold water through passages 3, 7, 11, 59, 57, 47, 15, 101, 103 and out of the faucet 107 while at the same time allowing a full flow of hot water through the passages 5, 9, 13, 61, 55, 45, 15, 101, 103 and out of faucet 107. In the process the cold water and hot water join in moving through passages 15, 101, 103 and are mixed to give a dispensing temperature from faucet 107 which is an average of the two.

If, after having brought the handle into the position such as described in connection with FIGS. 7 or 8, it is rotated, say clockwise (FIG. 1), the hot water supply through then unregistered ports 61 and 55 is cut off (FIG. 10). The cold water ports 57 and 59 remain in registry due to the length of the former. This results in a supply of cold water exclusively at full flow without mixing in of any hot water. Obviously, intermediate positions of the handle will result in a greater or less proportion of hot water, thus controlling the temperature. Also, the handle may be turned anticlockwise, to reverse the conditions shown in FIG. 10, in which case ports 55 and 61 would be more or less in registry while ports 57 and 59 would be more or less unregistered, to provide either all hot water at full flow or mixtures at various temperatures.

Mixing may also be accomplished at less than full flow by transversely angling the handle 89 less than the angle shown in FIG. 8, in which a condition such as shown in FIG. 9 will occur, providing for equal but throttled flows through the ports 57, 59 and 55, 61. Then upon rotating the handle anticlockwise or clockwise, temperature changes such as above described may be accomplished for the throttled flow.

Turning the handle 89 clockwise or anticlockwise while in its vertical position illustrated in FIGS. 1, 3 and 6 will result in appropriate mixtures under throttled flow conditions. On the other hand, maximum flow, with mixtures of any proportion, will be obtained when the handle 89 is moved in the maximum amount corresponding to FIG. 7 and rotated. The sequence of handle movements, in order to arrive at a given position, is arbitrary.

It will be observed from the above that the connection between key 73 and socket 71 should be loose enough to allow swinging movements of the stem 75 while at the same time providing a rotary drive between key 73 and the disc 41. This loose connection also permits the valve disc 41 to float in sliding engagement with the ring 65 and with the seats 25 under pressure of springs 23, without interference from the stem 75.

An important feature of the invention is that the lapped floating seal between the disc 41 and ring 65 prevents water in the valve chamber 15 from obtaining any access to the open space in the cap 17 which surrounds the stem 75, so that the latter is in effect freely movable in a dry compartment requiring no packing around the ball or the stem as would otherwise be required. Heretofore such outward leakage has been resisted by packings, flexible diaphragms, bellows, boots or the like connecting the universally rocking stem with the chamber parts. These devices rapidly deteriorated and leaked. This will not occur with the present construction. The slidable lapped surfaces 53 and 63 are reliable, long-wearing and freely movable.

Another advantage of the invention is the ease with which repairs may be effected without the necessity of complicated repacking. Disassembly is easily accomplished by unloosening the bolts 21 and removing the cover 17, whereupon the easily separable internal parts are exposed for ready removal and replacement, as required.

It will be noted that the engaging sliding surfaces 53 and 63 between the plate 41 and the ring 65 are at a substantial distance from the parts associated with stem 75. This affords the possibility of a large universal movement of the stem, as provided by the universal joint comprising the combination of the seat 79 and the ball 81. Thus this arrangement provides a large dry space for the universal mounting and action of the operating stem behind the dam afforded by the ring 65 and the sliding plate 41 thereon.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A mixing faucet comprising a faucet housing provided with a hot water inlet, a cold water inlet and an outlet leading to a discharge nozzle, a mixing chamber in said housing communicating with said hot and cold water inlets and said outlet, said housing having a hollow extension at the rear thereof defining one wall of said mixing chamber and provided with a seat, a first cap threadedly engaged to the end of said extension, a universal mounting in rotating contact with said seat, a second cap in said first cap abutting said universal mounting and a spring held under compression between said caps whereby said universal mounting is urged inwardly by the second cap and the spring into seating engagement with the seat in said extension, a valve stem affixed to said universal mounting and extending through said first and second caps to the exterior of said extension, a handle affixed to the outer end of said stem with the inner end of said stem extending into said mixing chamber, means for limiting the arc of rotation of said mounting, a dam member mounted at and sealing one wall of said mixing chamber at the inner end of said extension, inlet ports in the wall of the mixing chamber opposite to the dam member and communicating with said hot and cold water inlets, movable ported seats mounted in said inlet ports and provided with sealing means encompassing said seats, a valve plate rotatable and transversely movable in a plane in the mixing chamber, said plate having parallel faces, means urging said ported seats against one parallel face of said valve plate and thereby urging the other parallel face of the plate into seating and sealing engagement with said dam member to thereby seal against leakage into said extension and universal mounting, spaced ports in said one parallel face of the valve plate communicating with said mixing chamber outside the area defined by said dam member and adapted to communicate with said inlet ports through said ported seats when the handle moves said valve plate to bring one or both of its ports into registry with one or both ports of said ported seats, and a blind recess in said other parallel face for receiving the inner end of the valve stem.

2. In a mixing faucet having a housing provided with a hot water inlet, a cold water inlet and an outlet leading to a discharge nozzle, a mixing chamber in said housing communicating with said hot and cold water inlets and said outlet, a stem having a universal mounting in said housing, a handle affixed to the outer end of said stem with the inner end of said stem extending into said mixing chamber, means for limiting the arc of rotation of said mounting, inlet ports in one wall of said mixing chamber communicating with said hot and cold water inlets, movable ported seats mounted in and communicating with said inlet ports, a valve plate rotatable and radially movable in said mixing chamber and provided with opposite smooth parallel faces, means urging said ported seats against one of said parallel faces of the valve plate and the other parallel face into sealing contact with the opposite wall of said mixing chamber, spaced inlet ports in said one face of said valve plate movable into and out of communication with said ported seats, said valve plate having a recess in the other face receiving the inner end of the valve stem for moving said valve plate and two laterally spaced notches extending flatwise between its parallel faces communicating with the hot and cold water inlet ports in said valve plate and with said mixing chamber, said notches being spaced and sealed from said recess in the other face.

3. In a mixing faucet having a housing provided with a hot water inlet, a cold water inlet and an outlet leading to a discharge nozzle, a mixing chamber in said housing communicating with said hot and cold water inlets and said outlet, a stem having a universal mounting in said housing, a handle affixed to the outer end of said stem with the inner end of said stem extending into said housing, inlet ports in one wall of said mixing chamber communicating with said hot and cold water inlets, ported valve seats in and communicating with said inlet ports, a valve plate rotatable and radially movable in said mixing chamber and provided with opposite faces one of which is in sliding contact with said valve seats, a dam member sealing the wall of said mixing chamber opposite to the first mentioned wall, means urging the valve seats into contact with said one face and the opposite face of said valve plate into sliding sealing contact with said dam member, spaced inlet ports in said one face of said valve plate movable into and out of communication with said valve seats, said valve plate having a recess in the other face receiving the inner end of the valve stem for moving said valve plate and passages intermediate the opposite surfaces of said valve plate communicating with the hot and cold water inlet ports in said valve plate and with said mixing chamber but sealed from said recess in said opposite face of the valve plate.

4. In a mixing faucet having a housing provided with a hot water inlet, a cold water inlet and an outlet leading to a discharge nozzle, a mixing chamber in said housing communicating with said hot and cold water inlets and said outlet, a stem having a universal mounting in said housing, a handle affixed to the outer end of said stem with the inner end of said stem extending into said housing, inlet ports in one wall of said mixing chamber communicating with said hot and cold water inlets, movable ported valve seats in and communicating with said inlet ports, a valve plate rotatable and radially movable in said mixing chamber and provided with opposite smooth faces one of which is in sliding contact with said valve seats, a dam member sealing the wall of said mixing chamber opposite to the first mentioned wall, means for spring-biasing said valve seats against the adjacent face of said valve plate and the opposite face of said valve plate into sliding sealing contact with said dam member, spaced hot and cold water inlet ports in said adjacent face of said valve plate movable into and out of registry with the valve seats, said inlet ports of said valve plate each having a passage opening into said mixing chamber outside the area defined by said dam member, the opposite face of said valve plate being impervious except for a recess receiving the inner end of said stem to move the valve plate.

5. In a mixing faucet having a housing provided with a hot water inlet, a cold water inlet and an outlet leading to a discharge nozzle, a mixing chamber in said housing communicating with said hot and cold water inlets and said outlet, a stem having a universal mounting in said housing, a handle affixed to the outer end of said stem with the inner end of said stem extending into said housing, inlet ports in one wall of said mixing chamber communicating with said hot and cold water inlets, ported valve seats in and communicating with said inlet ports, a valve plate rotatable and radially movable in said mixing chamber and provided with opposite faces one of which is in sliding contact with said valve seats, a dam member sealing the wall of said mixing chamber opposite to the first mentioned wall, means urging the valve seats into contact with said one face and the opposite face of said valve plate into sliding sealing contact with said dam member, a hot and a spaced cold water inlet port in but said one face of said valve plate movable into and out of registry with the hot and cold water ports of said valve seats and communicating with said mixing chamber, the opposite face of said valve plate having a recess spaced from and closed to the inlet ports in said one face and to the mixing chamber, said recess receiving the inner end of said valve stem for moving said valve plate.

References Cited in the file of this patent

UNITED STATES PATENTS

| | | |
|---|---|---|
| 2,377,473 | Wolcott | June 5, 1945 |
| 2,503,881 | Manis | Apr. 11, 1950 |
| 2,601,966 | Busick | July 1, 1952 |